US006177906B1

(12) United States Patent
Petrus

(10) Patent No.: US 6,177,906 B1
(45) Date of Patent: Jan. 23, 2001

(54) MULTIMODE ITERATIVE ADAPTIVE SMART ANTENNA PROCESSING METHOD AND APPARATUS

(75) Inventor: Paul Petrus, Sunnyvale, CA (US)

(73) Assignee: ArrayComm, Inc., San Jose, CA (US)

( * ) Notice: Under 35 U.S.C. 154(b), the term of this patent shall be extended for 0 days.

(21) Appl. No.: 09/286,135

(22) Filed: Apr. 1, 1999

(51) Int. Cl.[7] ................................................. G01S 3/16
(52) U.S. Cl. ........................ 342/378; 342/373; 370/310; 370/347
(58) Field of Search .................................. 342/378, 380, 342/382, 383, 367, 373; 370/310, 321, 334, 347

(56) References Cited

U.S. PATENT DOCUMENTS

| | | | |
|---|---|---|---|
| 5,515,378 | * 5/1996 | Roy et al. ........................ | 370/95.1 |
| 5,887,038 | 3/1999 | Golden .............................. | 375/347 |
| 5,909,470 | * 6/1999 | Barratt et al. .................... | 375/324 |
| 5,930,243 | * 7/1999 | Parish et al. .................... | 370/334 |
| 6,018,317 | * 1/2000 | Dogan et al. .................... | 342/378 |

OTHER PUBLICATIONS

Rias Muhamed and T.S. Rappaport: "Direction of arrival estimation using antenna arrays," Technical Report MPRG–TR–96–03, Mobile and Portable Radio Research Group, Bradley Department of Electrical engineering, Virginia Polytechnic Institute, Jan. 1996, Section 3.8, pp. 64–78 and Bibliography, pp. 151–158 (also available as Rias Muhamed: "Direction of arrival estimation using antenna arrays," Masters Thesis, Bradley Department of Electrical Engineering, Virginia Polytechnic Institute and State University, Blacksburg, VA 24061, USA).

B.G. Agee: "Blind separation and capture of communication signals using a multitarget constant modulus beamformer," 1989 *IEEE Military Communications Conference* ("Milcom 89"), vol. 2, pp. 340–346, New York: IEEE, 1989.

J. Lundell and B. Widrow: "application of constant modulus adaptive beamformer to constant and non–constant modulus signals," Proceedings, 1988 Asilomar Conference on Signals, Systems and Computers (ACSSC–1988), pp. 432–436, 1988.

C.B. Papadias and A. Paulraj, a space–time constant modulus algorithm for SDMA systems, Proceedings, IEEE 46th Vehicular Technology Conference, pp. 86–90, 1996.

* cited by examiner

*Primary Examiner*—Thomas H. Tarcza
*Assistant Examiner*—Dao L. Phan
(74) *Attorney, Agent, or Firm*—Dov Rosenfeld; Inventek

(57) ABSTRACT

A method and apparatus is described for implementing adaptive smart antenna processing in a receiving communication station that includes an array of antennas and means for adaptive smart antenna processing, the method and apparatus including determining weight vectors for the adaptive smart antenna processing. Using the invention offers advantages when operating in a low SINR environment, for example, in a mobile environment in which the remote users are travelling at high speeds, hence the signals undergo fading. One aspect is hybrid weight adaptation that starts off with a method with good convergence properties, for example, one known to converge in a low SINR environment then switches to a method that converges rapidly, for example when started with relatively high quality initial conditions. To deal with high mobility, the weights determined from data at a particular burst are applied on that particular burst. Such weights may not be optimal for the subsequent bursts. When several users are present in a given channel, a multiport architecture is used to track each individual remote user.

33 Claims, 7 Drawing Sheets

MULTIMODE ITERATIVE ADAPTIVE SMART ANTENNA PROCESSING METHOD AND APPARATUS

FIELD OF THE INVENTION

This invention is related to wireless communication systems, and in particular to determining weights for adaptive smart antenna processing in a wireless communication receiver having an array of antenna elements and means for adaptive smart antenna processing.

BACKGROUND

Wireless communications systems that include communication stations that have an antenna array and means for adaptive smart antenna processing are known. Such communications stations are sometimes called smart antenna communications stations. When receiving a signal from a subscriber unit, the signals received by each of the antenna array elements are combined by the adaptive smart antenna processing means to provide an estimate of a signal received from a particular subscriber unit. With the smart antenna processing comprising linear spatial processing, each of the complex-valued (i.e., including in-phase I and quadrature Q components) signals received from the antenna elements is weighted in amplitude and phase by a weighting factor and the weighted signals are then summed to provide the estimate. The adaptive smart antenna processing means can then be described by a set of complex valued weights, one for each antenna elements. These complex valued weights in turn can be described as a single complex valued vector of m elements, where m is the number of antenna elements. This can be extended to include spatio-temporal processing, where the signal at each antenna element, rather than being simply weighted in amplitude and phase, is filtered by some complex valued filter, typically for time equalization. Each filter can be described by a complex-valued transfer function or convolving function. The adaptive smart antenna processing of all elements can then be described by a complex valued m-vector of m complex valued convolving functions.

Several methods are known for determining the weight vectors of received signals. These include methods that determine the directions of arrival of signals from subscriber units, and methods that use the spatial characteristics of subscriber units, for example, the spatial signatures. See for example U.S. Pat. Nos. 5,515,378 and 5,642,353 entitled SPATIAL DIVISION MULTIPLE ACCESS WIRELESS COMMUNICATION SYSTEMS, to Roy et al., for methods that use directions of arrival, and U.S. Pat. No. 5,592,490 entitled SPECTRALLY EFFICIENT HIGH CAPACITY WIRELESS COMMUNICATION SYSTEMS, to Barratt et al., and U.S. Pat. No. 5,828,658 entitled SPECTRALLY EFFICIENT HIGH CAPACITY WIRELESS COMMUNICATION SYSTEMS WITH SPATIO-TEMPORAL PROCESSING, to Ottersten et al., for methods that use spatial signatures. So-called "blind" methods determine the weights from the signals themselves, but without resorting to training signals—that is without determining what weights can best estimate a known symbol sequence. Such methods usually use some known characteristic of the signal transmitted by the subscriber unit to determine the best weights to use by constraining the estimate to have this property, and hence are called property restoral methods. Property restoral methods in turn can be classified into two groups. "Partial" property restoral methods restore one or more typically simple properties of the signal without completely reconstructing the modulated received signal, for example by demodulating and then re-modulating. "Decision directed" (DD) methods construct an accurate copy of the signal by making symbol decisions (e.g., demodulating) the received signal.

One example of the first group, partial restoral methods, is the constant modulus (CM) method, which is applicable to communications systems that use a modulation scheme that has a constant modulus, including, for example phase modulation (PM), frequency modulation (FM), phase shift keying (PSK) and frequency shift keying (FSK). See for example J. R. Treichler; M. L. Larimore: "New Processing Techniques Based on the Constant Modulus Algorithm," *IEEE Transactions on Acoustics, Speech, and Signal Processing,* vol. ASSP-33, No. 2, pp. 420–431, April 1985. Other partial property restoral techniques include techniques that restore the spectral properties of the signal, such as the spectral self-coherence. Spectral coherence restoral techniques use known spectral coherence properties of any signals received at the antenna array. For example, in certain situations, the signals may be assumed to be cyclo-stationarity, i.e., to have periodic autocorrelation functions. Other methods include those that restore high order statistics, e.g., moments or cumulants. See for example B. Agee, S. Schell, W. Gardner: "Spectral Self-Coherence Restoral: A New Approach to Blind Adaptive Signal Extraction Using Antenna Arrays," *Proceedings of the IEEE,* vol. 78, No. 4, April 1990, and U.S. Pat. No. 5,260,968 to Gardner, et al., entitled METHOD AND APPARATUS FOR MULTIPLEXING COMMUNICATIONS SIGNALS THROUGH BLIND ADAPTIVE SPATIAL FILTERING, and U.S. Pat. No. 5,255,210 to Gardner, et al., entitled SELF-COHERENCE RESTORING SIGNAL EXTRACTION APPARATUS AND METHOD.

Decision directed methods use the fact that the modulation scheme of the transmitted subscriber unit signal is known, and determine weights that produce a signal (a "reference signal") that has the required modulation scheme, and if transmitted by a remote user, would produce signals at the antenna elements of the array that are "close" to the signals actually received, the reference signal production including making symbol decisions. See for example U.S. patent applications Ser. No. 08/729,390 entitled METHOD & APPARATUS FOR DECISION DIRECTED DEMODULATION USING ANTENNA ARRAYS & SPATIAL PROCESSING to Barratt, et al. (filed Oct. 11, 1996), and Ser. No. 09/153,110 entitled METHOD FOR REFERENCE SIGNAL GENERATION IN THE PRESENCE OF FREQUENCY OFFSETS IN A COMMUNICATIONS STATION WITH SPATIAL PROCESSING to Petrus, et al. (filed Sep. 15, 1998), for descriptions of systems that use decision directed weight determination.

Some iterative methods, including partial restoral methods, for example, the CM method, are known to converge even for low signal-to-noise ratios (SNRs), low signal-to-interference-plus-noise-ratios (SINRs), and high fading situations as would be encountered in communication systems wherein the subscriber units are highly mobile. Such methods are called "iterative weight determining methods with good convergence properties" herein. Methods with good convergence properties may however take many iterations to converge. The CM method, for example, may so take many iterations to converge, and therefore may not converge fast enough in an actual system. For example, in a high mobility system, it is desired to use the weight vector on a current burst that is derived from the current burst's data. This implies rapid calculation of the weights, which may not be possible with the CM method. The decision directed method, on the other hand, is one example of a class of methods that converges rapidly if the initial condition, for example, the initial signal-to-noise ratio (SNR), and signal-to-interference-plus-noise-ratio (SINR) is high, or the initial weight vector is sufficiently close to the correct value. Methods that so converge rapidly if the initial weight vector is sufficiently close to the correct value are called "rapidly converging iterative weight determining methods" herein. Rapidly converging methods such as the DD method are becoming more widely used in smart-antenna based communication stations. When such a method breaks down, say in low SINR or high fading situations, the method may not converge. This problem becomes more severe in communication systems that have many users in the presence of high co-channel interference, that is, high interference from the signals within the conventional channel from other subscriber units when receiving a signal from a particular subscriber unit, such other subscriber units being from the same or from neighboring cells in the case of a cellular system that includes several receiving communications stations, each communicating with a set of subscriber units located within its cell.

In theory, adaptive smart antenna processing permits more than one communication link to exist in a single "conventional" communication channel so long as the subscriber units that share the same conventional channel can be spatially (or spatio-temporally) resolved. A conventional channel includes a frequency channel in a frequency division multiple access (FDMA) system, a time slot in a time division multiple access (TDMA) system (which usually also includes FDMA, so to be precise, the conventional channel is a time and frequency slot), and a code in a code division multiple access (CDMA) system. The conventional channel is then said to be divided into one or more "spatial" channels, and when more than one spatial channel exists per conventional channel, the multiplexing is called space division multiple access (SDMA). SDMA herein is used to mean inclusion of adaptive smart antenna processing both with one and with more than one spatial channel per conventional channel.

Rapidly converging methods such as decision directed methods also break down in the presence of high co-channel interference in SDMA systems that have more than one spatial channel per conventional channel.

Therefore, there is a need in the art for a adaptive smart antenna processing method that determines adaptive smart antenna processing weights efficiently in a low signal-to-interference plus noise environment or a high fading environment for SDMA systems that have one spatial channel per conventional channel, and for SDMA systems that have a plurality of spatial channels per conventional channel.

Thus there is a need in the art for weight determination methods that perform well under low SINR and high fading situations, and that converge rapidly, i.e., in a small number of iterations.

Thus there is a need in the art for a method that combines good convergence properties with rapid convergence properties.

Thus there is a need in the art for a "blind" method (i.e., one not using training data) that combines good convergence properties (convergence when the SINR is low) with rapid convergence.

SUMMARY

One object of the present invention is a weight determining method that combines the advantages of methods that have good convergence properties with the advantages of methods that converge rapidly.

Another object of the present invention is a method and apparatus for "blind" weight determination that perform well under low SINR and high fading situations, and that converge rapidly, i.e., in a small number of iterations.

Another object is a adaptive smart antenna processing method and apparatus that determines adaptive smart antenna processing weights efficiently in a low signal-to-interference plus noise environment or a high fading environment for SDMA systems that have one spatial channel per conventional channel.

Another object is a adaptive smart antenna processing method and apparatus that determines adaptive smart antenna processing weights efficiently in a low signal-to-interference plus noise environment or a high fading environment for SDMA systems that have a plurality of spatial channels per conventional channel.

Another object of the present invention is a adaptive smart antenna processing method and apparatus that determines adaptive smart antenna processing weights to use in a current burst of data, the weights adapted for the current burst of data by being determined from data from the current burst.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENT

Base Station Architecture

Figure 1:
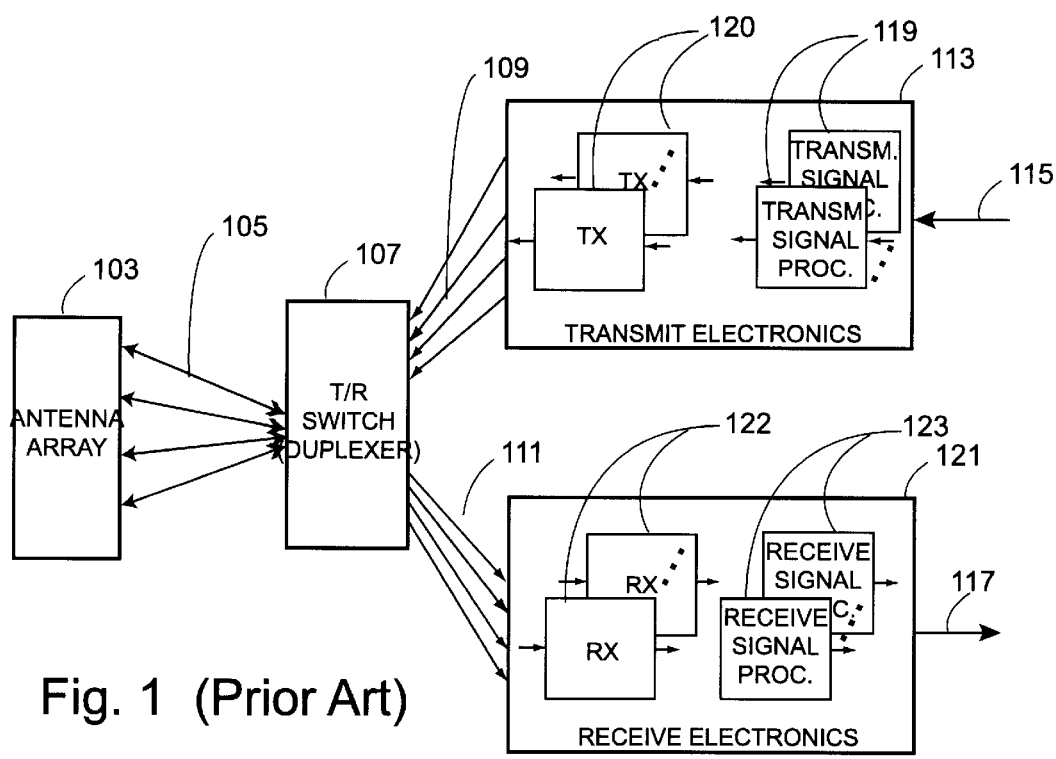
FIG. 1 is a functional block diagram of a multi-antenna transceiver system that may include a receive weight determiner according to aspects of the present invention.

The preferred embodiment method and apparatus is implemented in a communication receiver, in particular, in a PHS-based antenna-array communications station (transceiver) such as that shown in FIG. 1, with m antenna elements in the antenna array. In the particular embodiment, m=4. While systems similar to that shown in FIG. 1 may be prior art, a system such as that of FIG. 1 with elements programmed or hard wired to carry aspects of the present invention is not prior art. Also, this invention is in no way restricted to using the PHS air interface or to TDMA systems, but to any communications receiver that includes adaptive smart antenna processing means. In FIG. 1, a transmit/receive ("TR") switch 107 is connected between an m-antenna array 103 and both transmit electronics 113 (including one or more transmit signal processors 119 and m transmitters 120), and receive electronics 121 (including m receivers 122 and one or more receive signal processors 123), for selectively connecting one or more elements of antenna array 103 to the transmit electronics 113 when in the transmit mode and to receive electronics 121 when in the receive mode. Two possible implementations of switch 107 are as a frequency duplexer in a frequency division duplex (FDD) system, and as a time switch in a time division duplex (TDD) system. The PHS preferred embodiment of this invention uses TDD. The transmitters 120 and receivers 122 may be implemented using analog electronics, digital electronics, or a combination of the two. The preferred embodiment receivers 122 generate digitized signals that are fed to signal processor or processors 123. Signal processors 119 and 123 may be static (always the same), dynamic (changing depending on desired directivity), or smart (changing depending on received signals), and in the preferred embodiments are adaptive. Signal processors 119 and 123 may be the same one or more DSP devices with different programming for the reception and transmission, or different DSP devices, or different devices for some functions, the same for others.

Note that while FIG. 1 shows a transceiver in which the same antenna elements are used for reception and transmission, it would be cleat that one also can have separate antennas for receiving and transmitting, and that either only receiving or only transmitting or both receiving and transmitting may include adaptive smart antenna processing.

The Personal HandyPhone System (PHS), described for example in the Association of Radio Industries and Businesses (ARIB, Japan) Preliminary Standard, Version 2, RCR STD-28 and variations as described in Technical Standards of the PHS Memorandum of Understanding Group (PHS MoU—see http://www.phsmou.or.jp), is an 8 slot time division multiple access (TDMA) system with true time division duplex (TDD). Thus, the 8 timeslots are divided into 4 transmit (TX) timeslots and 4 receive (RX) timeslots. This implies that for any particular channel, the receive frequency is the same as the transmit frequency. It also implies reciprocity, i.e., the propagation path for both the downlink (from base station to users' remote terminals) and the uplink (from users' remote terminals to base station) is identical, assuming minimum motion of the subscriber unit between receive timeslots and transmit timeslots. The frequency band of the PHS system used in the preferred embodiment is 1895–1918.1 MHz. Each of the 8 timeslots is 625 microseconds long. The PHS system has a dedicated frequency and timeslot for a control channel on which call initialization takes place. Once a link is established, the call is handed to a service channel for regular communications. Communication occurs in any channel at the rate of 32 kbits per second (kbps), called full rate. Less than full rate communication is also possible, and the details of how to modify the embodiments described herein to incorporate less than full rate communication would be clear to those of ordinary skill in the art.

In the PHS used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec.

The PHS system uses $\pi/4$ differential quaternary (or quadrature) phase shift keying ($\pi/4$ DQPSK) modulation for the baseband signal. The baud rate is 192 kbaud. That is, there are 192,000 symbols per second.

Figure 2:
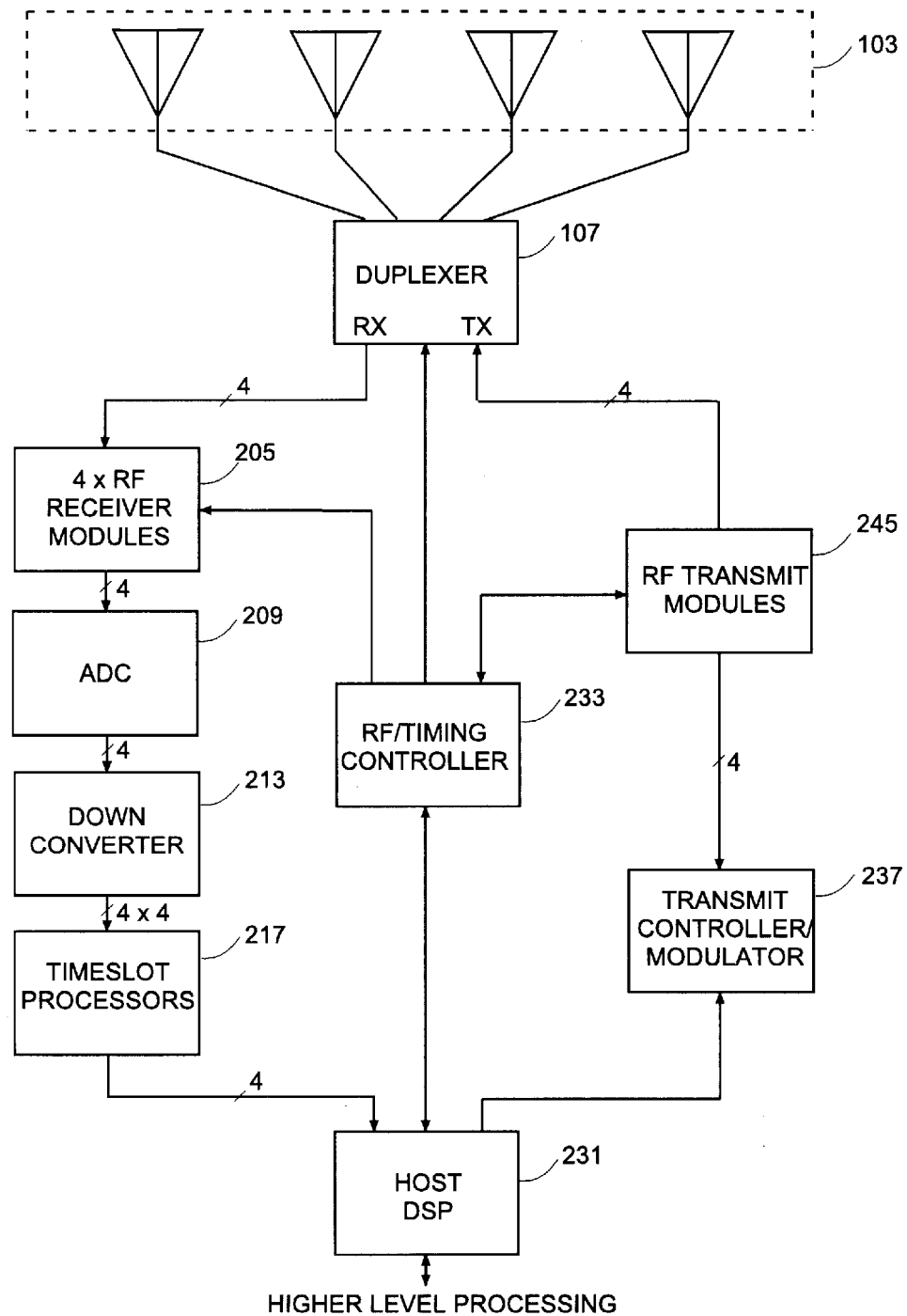
FIG. 2 is a more detailed block diagram of a transceiver including a signal processor that when running a set of instructions implements a receive weight determiner according to aspects of the present invention.

FIG. 2 shows a more detailed but still simplified block diagram of a PHS base station which includes adaptive smart antenna processing and on which an embodiment of the invention is implemented. Again, while systems with architectures similar to that shown in FIG. 2 may be prior art, a system such a that of FIG. 2 with elements programmed or hard wired to carry aspects of the present invention is not prior art. In FIG. 2, a plurality of m antennas 103 is used, where m=4. More or fewer antenna elements may be used. The outputs of the antennas are connected to a duplexer switch 107, which in this TDD system is a time switch. When receiving, the antenna outputs are connected via switch 107 to a receiver 205, and are mixed down in analog by RF receiver modules 205 from the carrier frequency (around 1.9 GHz) to an intermediate frequency ("IF"). This signal then is digitized (sampled) by analog to digital converters ("ADCs") 209. This is then downconverted digitally by digital downconverter 213 to produce a four-times oversampled complex valued (in phase I and quadrature Q) sampled signal. Thus, elements 205, 209 and 213 correspond to receiver 122 of FIG. 1. For each of the m receive timeslots, the m downconverted outputs from the m antennas are fed to a digital signal processor (DSP) device 217 (hereinafter "timeslot processor") for further processing. In the preferred embodiment, commercial DSP devices are used as timeslot processors, one per receive timeslot.

The timeslot processors 217 perform several functions including the following: received signal power monitoring, frequency offset estimation/correction and timing offset estimation/correction, smart antenna processing including determining weights for each antenna element to determine a signal from a particular remote user using a method according to one aspect of the invention, and demodulation of the determined signal.

The output of the timeslot processor 217 is demodulated data burst for each of the m (=4) receive timeslots. This data is sent to host DSP processor 231 whose main function is to control all elements of the system and interface with the higher level processing, which is the processing which deals with what signals are required for communications in all the different control and service communication channels defined in the PHS communication protocol. In the preferred embodiment, host DSP 231 is also a commercial DSP device. In addition, timeslot processors send the determined receive weights to host DSP 231.

RF controller 233 interfaces with the RF system, shown as block 245 and also produces a number of timing signals that are used by both the RF system and the modem. RF controller 233 receives its timing parameters and other settings for each burst from the host DSP 231.

Transmit controller/modulator 237, receives transmit data from host DSP 231. The transmit controller uses this data to produce analog IF outputs which are sent to the RF transmitter (TX) modules 245. The specific operations transmit controller/modulator 237 performs include converting data bits into a complex valued π/4 DQPSK modulated signal, up-converting to a IF frequency, weighting by complex valued transmit weights obtained from host DSP 231, and converting the signals using digital to analog converters ("DACs") to analog transmit waveforms which are sent to transmit modules 245.

Transmit modules 245 upconvert the signals to the transmission frequency and amplify the signals. The amplified transmission signal outputs are coupled to the m antennas 103 via duplexer/time switch 107.

Notation

The following notation is used. Let there be m antenna elements (m=4 in the preferred embodiment) and let $z_1(t), z_2(t), \ldots, z_m(t)$ be the complex valued responses (that is, with in-phase I and quadrature Q components) of the first, second, ..., m'th antenna elements, respectively, after down-conversion, that is, in baseband, and after sampling (four-times oversampling in the preferred embodiment). In the above notation, but not necessarily for the invention, t is discrete. These m time-sampled quantities can be represented by a single m-vector z(t) with the i'th row of z(t) being $z_i(t)$. For each burst, a finite number, say N, of samples is collected, so that $z_1(t), z_2(t), \ldots, z_m(t)$ can each be represented as a N-row vector and z(t) can be represented by a m by N matrix Z. In much of the detailed description hereinafter, such details of incorporating a finite number of samples are left out, and how to include these details would be clear to those of ordinary skill in the art.

Suppose several signals are sent to the base station from several, say $N_s$, remote users. In particular, suppose that a subscriber unit of interest transmits signal s(t). Adaptive smart antenna processing includes taking a particular combination of the I values and of the Q values of the received signals $z_1(t), z_2(t), \ldots, z_m(t)$ in order to extract an estimate of the transmitted signal s(t). Such weights may be represented by the receive weight vector for the this particular subscriber unit, denoted by a complex valued weight vector $w_r$, with $i^{th}$ element $w_{ri}$. The estimate of the signal sent is then $$\hat{s}(t) = \sum_{i=1}^{m} w'_{ri} z_i(t) = w_r^H z(t) \quad (1)$$

where $w'_{ri}$ is the complex conjugate of $w_{ri}$ and $w_r^H$ is the Hermitian transpose (that is, the transpose and complex conjugate) of receive weight vector $w_r$. In embodiments which include spatio-temporal processing, each element in the receive weight vector is a function of time, so that the weight vector may be denoted as $w_r(t)$, with ith element $w_{ri}(t)$. The estimate of the signal may then be expressed as $$\hat{s}(t) = \sum_{i=1}^{m} w'_{ri}(t) * z_i(t) \quad (2)$$

where the operator "*" is the convolution operation. Spatio-temporal processing, for example, combines time equalization with spatial processing, and is particularly useful for wideband signals. Forming the estimate of the signal using spatio-temporal processing may equivalently be carried out in the frequency (Fourier transform) domain. Denoting the Frequency domain representations of $\hat{s}(t), z_i(t),$ and $w_{ri}(t)$ by $\hat{S}(k), Z_i(k),$ and $W_i(k)$, respectively, where k is the discrete frequency value, $$\hat{S}(k) = \sum_{i=1}^{m} W'_{ri}(k) Z_i(k). \quad (3)$$

With spatio temporal processing, the convolution operation of Eq. (2) is usually finite and on sampled data, equivalent to combining the spatial processing with time equalization using a time-domain equalizer with a finite number of equalizer taps. That is, each of the $w_{ri}(t)$ has a finite number of values of t and equivalently, in the frequency domain, each of the $W_i(k)$ has a finite number of k values. If the length of the convolving functions $w_{ri}(t)$ is n, then rather than determining a complex valued m-weight vector $w_r$, one determines a complex valued m by n matrix $W_r$ whose columns are the n values of $w_r(t)$.

In the remainder of the description, whenever complex valued receive weight vector $w_r$ or its elements are mentioned, it will be understood that this may be for spatial processing or generalized to incorporate spatio-temporal processing as described above to determine a weight matrix $W_r$. Both spatial processing and spatio-temporal processing is thus referred to as adaptive smart antenna processing herein.

Determining Spatial Weights

"Blind" methods for determining weights for adaptive smart antenna processing are methods that do not require training data to be reconstructed. The methods of the present invention, like most blind methods, use some knowledge of the form of the originally transmitted signal and constrain the output signal to have one or more known input signal properties. The property may be the amplitude characteristics, or some statistical characteristics such as the entropy or cyclo-stationarity, the correct modulation scheme, or reconstructing an accurate replica. Such methods are sometimes called "property restoral."

Methods With Good Convergence Properties

Methods with good convergence properties include partial property restoral methods: those methods that reproduce one or more properties without attempting to reproduce an exact replica by determining the bit stream and reconstructing a signal. In this class are included methods that preserve the amplitude (modulus), the entropy, and the spectral coherence (e.g., cyclo-stationarity) of the signal.

The constant modulus (CM) method is a very simple and effective technique applicable for signals modulated by schemes that result in constant amplitude signals. These include all forms of phase and frequency modulation, including the differential phase shift keying modulation of the PHS system used in the preferred embodiment. As explained below, the CM method also is applicable to non constant modulus signals. The CM method determines weights that a) restore the constant amplitude (constant modulus) property of a signal and, b) produce a signal that, if transmitted by a remote user, would produce signals at the antenna elements of the array that are "close" to the signals actually received. Amplitude variations may be introduced by interference, by fading, and by timing offsets in those modulation schemes wherein the constant modulus property depends on accurate timing offset correction, including, for example, the DQPSK modulation scheme of the preferred embodiment where the constant modulus property only holds at baud points. In the presence of co-channel interferers, the CM method tends to pick the strongest signal, whether this is the desired signal or a co-channel interferer. Even if the desired signal strength is greater than any interferer's by only 0.5 dB, the CM will still correctly pick up the strongest, i.e., the desired signal. That is, a CM method has very good convergence properties.

There are many variations of the CM method. These typically minimize a cost function of the general form:

$$J_{p,q} = E\{[|s_{ref}(t)|^p - 1]^q\} \quad (4)$$

where E(.) denotes a statistical expectation operation, and p and q are positive integers, typically 1 or 2. It would be clear to those in the art that, in practice, the statistical operation is replaced with some form of sample averaging or accumulation (e.g., by summation for a set of samples, which in the preferred embodiment is a subset of all the samples in a burst). Also, it would be clear and is within the scope of the present invention to add more terms in the cost function of Eq. (4). For example, a term may be added to limit the weight vector magnitude. See above-referenced U.S. application Ser. No. 08/729,390 for an example of a cost function (not a CM copst function) with such an added term. Th signal $s_{ref}(t)$ is the normalized copy signal (called the "reference signal") used in the cost function. That is, the reference signal for determining the weights is the weighted sum of received antenna signals which is then normalized. Weight determining is determining the set of weights that minimizes the cost function in Eq. (4).

The CM method also is applicable to non constant modulus signals. See, for example, J. Lundell and B. Widrow: "application of constant modulus adaptive beamformer to constant and non-constant modulus signals," *Proceedings, 1988 Asilomar Conference on Signals, Systems and Computers* (*ACSSC*-1988), pp. 432–436, 1988. Lundell and Widrow use a cost function like that of Eq. (4) with p=q=2 (this is called a 2-2 CM method) and showe that any constant and non-constant modulus signal can be recovered using such a 2-2 CM method, as long as the ratio of the fourth moment to the square of the second moment (the ratio called the kurtosis) is below 2. For example, an M-quadrature amplitude modulated signal (M-QAM), is known to have a kurtosis of approximately 1.4−1.2/(M-1), hence the kurtosis of any QAM signal is always smaller than 1.4. A CM method therefore is applicable to such a signal.

At least one iteration of a particular method with good convergence properties, the CM method, is used in the preferred embodiment, and that implementation of the CM method uses values of 1 for p and 2 for q in Eq. (4). When this invention is applied to a non constant modulus signal, and the CM method is used, other values for p and q, e.g., p=q=2, may be used. The preferred implementation is also a block based method. That is, a block of the antenna received signals is weighted and the weights are determined using this block of data. The block is a subset of the samples in a burst. In particular, 75 samples of the 120 PHS burst symbols preferably are used, where the 75 symbols are in the payload which is in the middle of the PHS burst. Using data from the payload advantageously ensures that the data used for weight calculation for any one remote user is not the same as that for another subscriber unit. There are a maximum of 88 such payload samples in a PHS burst.

With p=1 and q=2, the method is called the least squares constant modulus method, and includes the following steps.

1. Initialize the weight vector. For example, use $w_{r,initial}=[1\ 0\ 0\ \ldots\ 0]'$ where x' denotes the transpose of x. In an improved embodiment, the largest eigenvector of $R_{zz}=ZZ^H$ corresponding to the largest singular value of Z is used. In yet another embodiment, the weight vector from the previous burst is used;

2. For the samples of interest, perform a copy signal and normalize:

$$s_{ref}(t) = \frac{w_r^H z(t)}{|w_r^H z(t)|}; \quad (5)$$

3. Compute the weight vector $w_r$ using a least squares procedure. That is, $$w_r = \arg\min_{w_r} \sum_{t=1}^{N} (s_{ref}(t) - w_r^H z(t))^2 \quad (6)$$

where N is the number of samples used in the calculation. The solution of Eq. (6) is $$w_r = R_{zz}^{-1} r_{zs}, \quad (7)$$

where $R_{zz}=ZZ^H$, $r_{zs}=$ $$r_{zs} = \sum_{t=1}^{N} z(t) s'_{ref}(t);$$

$z(t)s'_{ref}(t)$; and N is the number of samples used; and

4. Repeat steps 2 and 3 until convergence is reached.

Note that in the calculation of step 3, in practice, overall scale factors are unimportant. All the scale factors for the weights preferably are applied in combination as a gain in the system.

Note that the CM method can be extended to spatio-temporal processing. One known method uses a 2-2 CM method and shows that under certain assumptions usually met in practice, the CM method for spatio-temporal weight determination (i.e., for weight matrix determination) is sure to converge. See C. B. Papadias and A. Paulraj, a space-time constant modulus algorithm for SDMA systems," *Proceedings, IEEE 46th Vehicular Technology Conference*, pp. 86–90, 1996. The Papadias et al method, however, is not block data based. However, the spatial weight determining method can easily be modified for spatio-temporal processing according to a weight matrix by re-expressing the problem in terms of matrices and vectors of different sizes. As throughout this description, let m be the number of antenna elements, and N the number of samples. Let n the number of time equalizer taps per antenna element. Each row vector of N samples of the (m by N) received signal matrix Z can rewritten as n rows of shifted versions of the first row to produce a received signal matrix Z of size (mn by N), which when pre-multiplied by the Hermitian transpose of a weight vector of size (mn by 1)produces an estimated received signal row vector of N samples. The spatio-temporal problem has thus been re-expressed as a weight vector determining problem. For the CM method, in Eq. (7), for example, the weight vector is a "long" weight vector of size (mn by 1), $R_{zz}$ is a matrix of size (mn by mn), and $r_{zs}$ is a long vector of size (mn by 1). Rearranging terms provides the required (m by n) weight matrix.

Since in the preferred embodiment, in order for the CM property to hold, the sampled data needs to be approximately on-baud, in carrying out step 2, timing offset estimation and correction are performed, which in this case may include decimation in time and interpolation because the samples of the received signals from each antenna element of antenna array 103 are oversampled and may include some timing offset. The variable t in Eqs. (5) and (7) therefore represents approximately on-baud times for the samples. As would be clear, and as is also described in above-referenced U.S. patent application Ser. No. 09/153,110, the timing offset estimation/correction (which may include decimation/ interpolation) may be performed on the m signals prior to the signal copy operation, or on the signal after the signal copy operation.

Figure 8:
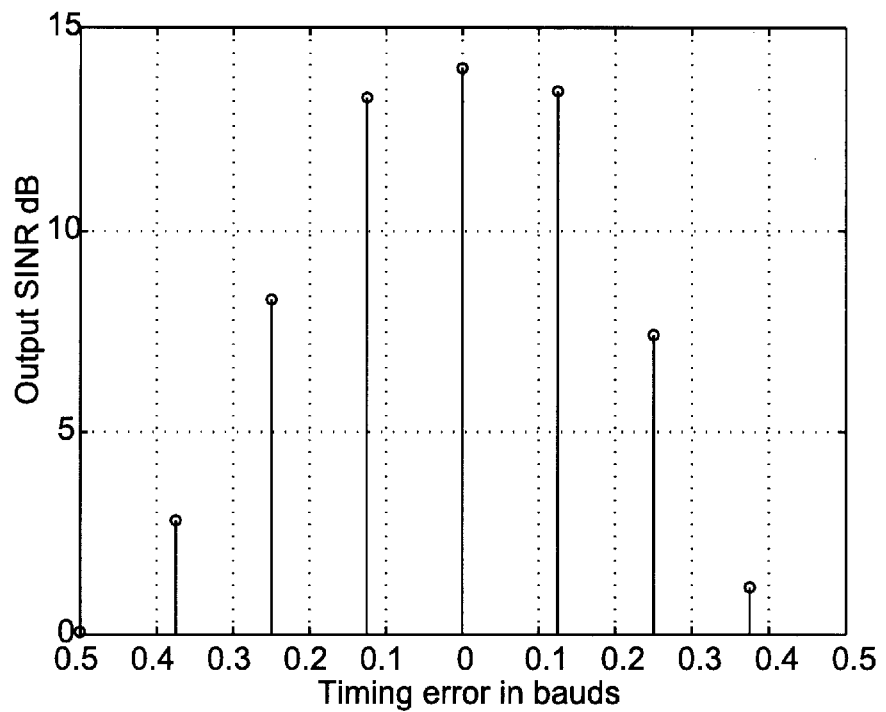
FIG. 8 shows the effect of timing offset on the performance of the CM method.

Simulations were performed to determine the level of accuracy of the timing offset/baud point estimation. FIG. 8 shows the results. In the simulation, the output SINR obtained using CM weights was calculated when the signal was sampled not exactly at the baud point, but offset from the ideal baud point by some timing offset which varied from −½ to +½ baud in steps of ⅛ of a baud. The results show that even for a signal offset by ±⅛ of a baud, the output SINR degrades only by 0.6 dB. Although this number is specific to the test case shown, the conclusion is that the accuracy of the timing offset correction for the CM method need not be high. A simple method therefore may be used for the offset correction/decimation/interpolation to produce approximately baud-aligned samples.

Also note that timing offset correction (including decimation/interpolation) of an oversampled signal may not be necessary for all modulation schemes that have the constant modulus property. For example, the Digital European Cordless Telecommunications (DECT) standard and the Global System for Mobile Communications (GSM) standard use Gaussian Minimum-Shift Keyed (GMSK) signals, which always have a constant modulus, so timing offset correction is not needed for the CM method in those cases.

Implementation of a least squares CM weight determination method is fairly straightforward. Since no demodulation occurs, frequency offset estimation and correction, and demodulation, are not required. In one embodiment of the present invention, frequency offset correction is carried out when implementing the CM method, even though this is not required. An additional feature of simple property restoral methods such as constant modulus methods is that convergence occurs even under very low signal-to-interference-plus-noise (SINR) values.

The main disadvantage of methods with good convergence properties such as simple property restoral methods is that they may take many iterations to converge. In a typical system, processing power, such as DSP processing power, is extremely limited, and thus convergence using the CM method may not occur within a specific amount of time, for example in order to use the weight vector within the current burst.

Rapidly Converging Methods

Rapidly converging methods such as decision directed methods, unlike partial property restoral methods, converge very fast. With a decision directed method, the property restored is a complete replica of the originally transmitted signal that has the correct modulation scheme. That is, a signal copy operation, such as Eq. (1), estimates a received signal, and that signal is demodulated and a reference signal with the correct bit stream is constructed. To work well, one needs to correct for any frequency and timing offsets when constructing the reference signal. The correct weights are those that produce a reference signal that is close to the transmitted signal. The scheme may involve one or more iterations to achieve the "best" weights. While the timing offset correction (including any decimation) and the frequency offset correction are shown below as occurring after the signal copy operation, clearly one or more of these can be carried out prior to the signal copy operation. See above-referenced co-owned U.S. patent applications Ser. Nos. 08/729,390 and 09/153,110 for examples of these operations occurring before and after signal copy, and for a detailed description of a decision directed method. When a least squares criterion is used, the general method includes the following steps:

1. Initialize the weight vector. For example, use $w_{r,initial}=[1\ 0\ 0\ \ldots\ 0]'$ where x' denotes the transpose of x. In an improved embodiment, the singular vector of $R_{zz}=ZZ^H$ corresponding to the largest singular value is used. In yet another embodiment, the weight vector from the previous burst is used. As will be described below, one aspect of the present invention includes using a decision directed method after a partial property method is used. In such a case, when implemented in any of the embodiments of the present invention, the last obtained weight vector (i.e., using a partial property restoral method) is used;

2. Perform a signal copy $$s(t)=w_r^H z(t), \qquad (8)$$

followed by decimation/interpolation if the samples are originally oversampled (in an alternative, the decimation/interpolation may occur prior to the copy signal operation);

3. Estimate timing and frequency offset to produce a signal that has the correct timing and frequency offsets;

4. Determine a reference signal $s_{ref}(t)$ by making symbol decisions (i.e., demodulating), such that $s_{ref}(t)$ has the correct bit stream and the same modulation scheme, and the same timing and frequency offsets as the signal transmitted to the receiver from the particular user;

5. Computing the weight vector by least squares minimization of over $w_r$. That is, $$w_r = \arg\min_{w_r} \sum_{t=1}^{N} |s_{ref}(t) - w_r^H z(t)|^2 \qquad (9)$$

which has the solution $$w_r = R_{zz}^{-1} r_{zs}, \qquad (10)$$

where $R_{zz}=ZZ^H$ and $$r_{zs} = \sum_{t=1}^{N} z(t) s'_{ref}(t);$$

and

6. Repeat steps 2, 3, 4, and 5 until convergence is reached.

Note that steps 2, 3 and 4 require that the signal be corrected for frequency and timing offsets so that the correct demodulation decision is made in step 4, while step 5 typically requires that the correct frequency and timing offsets are re-introduced so that the reference signal and the copy signal in the cost function have the same timing and frequency offsets. Note also that the minimization of Eq. (9) also may include other terms, such as a weighted norm of the weight vector term to place a constraint on the norm of the weight vector, as described above for the CM case and as described in above-referenced U.S. application Ser. No. 08/729,390. See also above-referenced co-owned U.S. patent applications Ser. Nos. 08/729,390 and 09/153,110 for a detailed description of how to determine a reference signal (step (4)). This also is described below with the aid of FIG. 4.

Note that the decision-directed method can easily be extended to determining the weight matrix for spatio-temporal processing, for example, by re-arranging terms as described hereinabove for the CM method, and by other methods as would be clear to those in the art. This invention, therefore, also covers methods for determining weight vectors and weight matrices for spatio-temporal processing.

Decision directed methods thus reproduce an accurate replica of the signal supposedly transmitted to the receiver, whereas partial property restoral methods reproduce one or more simple properties, such as the correct amplitude. Decision directed systems perform extremely well, and converge in very few iterations in a reasonably high SINR environment. However, these methods are sensitive to the initial conditions, and may not even converge when the initial SINR is low. This is common in high mobility cellular systems and other systems that exhibit fading.

Note that an iteration of the CM method is typically computationally cheaper than an iteration of a decision directed method, not requiring frequency offset correction nor demodulation.

The Preferred Method: Single User

One aspect of the invention is a weight determining method which includes carrying out a number $N_1$ of iterations of an iterative weight determining method with good convergence properties, such as a partial property restoral method, preferably the CM method, combined with and followed by a second number $N_2$ of iterations of a rapidly converging method, such as the decision directed method to achieve the advantage of good convergence properties with rapid convergence. The $N_1$ CM iterations bring the starting condition for the $N_2$ iterations of the decision directed method to the region where rapid convergence of the decision directed method is most certain. The preferred embodiment uses one iteration of the decision directed method ($N_2=1$) while an alternate implementation uses two iterations($N_2=2$). The method can be re-stated as carrying out iterations of an iterative weight determining method with good convergence properties until a switching criterion is met, then, starting with the weights obtained with the method with good convergence properties, carrying out a number of iterations of a rapidly converging method. In one case, the switching criterion is an explicitly defined number $N_1$ of iterations. In another, the preferred embodiment, $N_1$ is not explicitly specified. Rather, the switching criterion is a SINR threshold for the copy signal, and the switchover to the decision directed method occurs when the SINR estimate is equal to or exceeds the threshold. In this way, a sufficient number $N_1$ of CM iterations is used in order to achieve a SINR which is sufficient to ensure convergence of the decision directed method in only $N_2$ further iterations.

Many methods of determining SINR estimates may be used. In the preferred embodiment, the method used is as described in U.S. patent application Ser. No. 09/020,049 to Yun entitled POWER CONTROL WITH SIGNAL QUALITY ESTIMATION FOR SMART ANTENNA COMMUNICATION SYSTEMS (filed Feb. 6, 1998). The implementation of the signal quality estimation method is now described.

Denote by N the number of samples of a burst to use for the estimate. The sampled modulus information is first extracted by forming the sum of the squares of the in phase and quadrature signals (the real and imaginary parts of signal s(t). The mean power and mean squared power are then determined using averages over the number of samples for the expectation operation.

$$\overline{R^2} = \frac{1}{N}\sum_{t=1}^{N} I^2(t) + Q^2(t), \text{ and} \quad (11)$$

$$\overline{R^4} = \frac{1}{N}\sum_{t=1}^{N} (I^2(t) + Q^2(t))^2. \quad (12)$$

Note that once the instantaneous power $R^2(t)=I^2(t)+Q^2(t)$ is determined, determining the squared power $R^4(t)=[R^2(t)]^2$ requires only a single additional multiplication per sample, and the estimated signal-to-interference-plus-noise-ratio is determined, preferably with at most one square root operation, using $$SINR = \frac{\sqrt{\frac{2 - \overline{R^4}}{(\overline{R^2})^2}}}{1 - \sqrt{\frac{1 - \overline{R^4}}{(\overline{R^2})^2}}} \quad (12)$$

$$= \frac{A - \sqrt{A}}{1 - A}, \text{ where } A = 2 - \frac{\overline{R^4}}{(\overline{R^2})^2}$$

Both the ratio $$\frac{\overline{R^4}}{(\overline{R^2})^2}$$

and the quantity A are sometimes called the kurtosis. This preferred method of signal quality estimation is insensitive to frequency offset, so is a particularly attractive method for use with the CM method which also is insensitive to frequency offsets.

Other methods of determining the quality of the post copy operation signal also may be used in alternate implementations of the invention.

Figure 3:
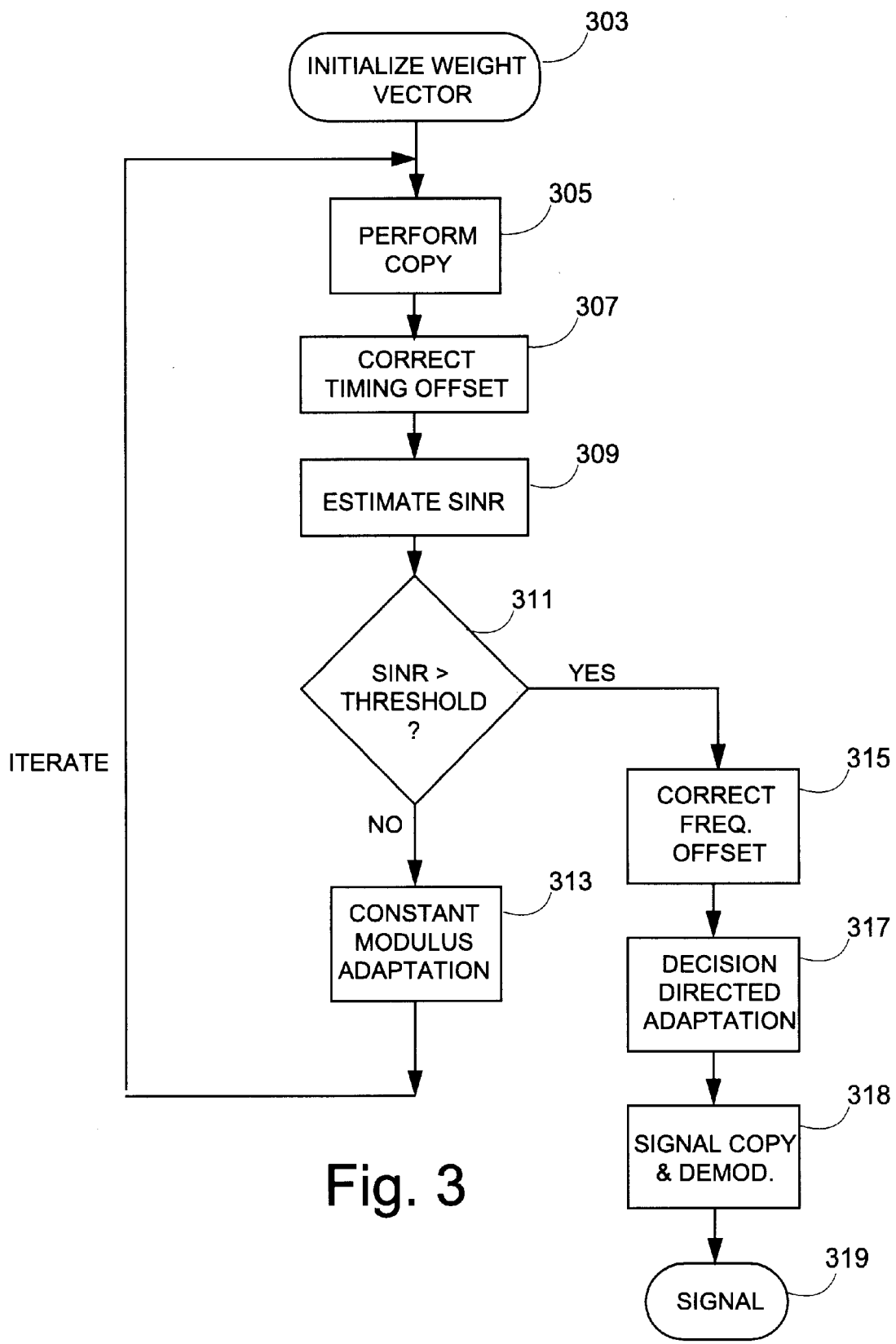
FIG. 3 is a flow chart of one embodiment of the weight determining method of the present invention.

The method for weight determination for a single user is illustrated in the flow chart of FIG. 3. An initial weight vector is formed 303. This might be [1 0 0 . . . 0]', or in an improved embodiment, the singular vector of $R_{zz}=ZZ^H$ corresponding to the largest singular value is used. In yet another embodiment, the weight vector from the previous burst is used. A copy operation 305 is now performed according to Eq. (1), but in the preferred embodiment, using only the middle part of a burst, preferably only 75 symbols (300 samples) from the payload part in the middle of the burst. The output is corrected for timing offset 307. Any timing offset correction method may be used. As discussed hereinabove, the timing offset correction need not be very accurate. The preferred method is as described in above-referenced U.S. patent application Ser. No. 09/153,110. The copy and timing offset correction operation may be combined. Inherent in the timing offset correction operation, but not explicitly shown in FIG. 3, is any necessary decimation and interpolation, so that after step 307, the data includes 75 complex valued (I and Q) samples approximately at the baud points of 75 symbols from the middle of the current burst. The SINR of the copied signal is estimated 309 preferably using the kurtosis as described hereinabove. In step 311, it is determined if the SINR has exceeded a threshold SNR. If not, an iteration of the constant modulus method is performed in step 313 using the minimum squared cost function criterion as described by Eqs. (6) and (7) above. Then the method returns to the copy operation of step 305 for another iteration. If on the other hand, the SINR threshold is determined in step 311 to have been exceeded, $N_2$ iterations of the decision directed method are performed in steps 315 and 317, including frequency offset correction 315. Any frequency offset correction method may be used, and the preferred method is as described in above-referenced U.S. patent application Ser. No. 09/153,110. Similarly, for the decision directed adaptation, including generating the reference signal, any method may be used, and the preferred embodiment uses the method described in above-referenced U.S. patent application Ser. No. 09/153,110. When the weight is determined, in the preferred embodiment, only a subset of the samples in each burst is used. Therefore the finally determined weight vector is now used in a copy operation and demodulation step 318 on the whole burst. In this embodiment, step 318 includes timing and frequency offsets determination and correction, demodulation, preferably using the architecture described below with the aid of FIG. 4. The output of the decision directed adaptation is a signal 319.

The preferred embodiment for the reference signal generation which is part of decision directed adaptation step 317 (using part of the burst data), and is used for demodulating all the burst data in step 318, preferably uses a reference signal generation architecture and method that includes a tracking mechanism, preferably sample-to-sample, that forms the phase of the reference signal at a sample point by relaxing the phase of a signal ideally advanced from a previous reference signal sample, towards the phase of the copy signal at the same sample point, the copy signal formed from the received antenna signals. The reference signal is constructed at each sample point, by constructing an ideal signal sample from the copy signal at the same sample point, the ideal signal sample having a phase determined from the copy signal at the sample point, with the phase of the ideal signal sample at an initial symbol point set to be an initial ideal signal phase, and relaxing the phase of the ideal signal sample towards the copy signal sample phase to produce the phase of the reference signal. The phase of the ideal signal is determined from the phase of the reference signal at the previous sample point for which the phase is determined, and from a decision based on the copy signal. In one implementation, the reference signal is determined in the forward time direction, and in another implementation, the reference signal samples are determined in the backwards time direction. In one version, the step of relaxing the phase of the ideal signal sample towards the phase of the copy signal $b_N(n)$ corresponds to adding a filtered version of the difference between the copy signal phase and ideal signal phase. In another version, the step of relaxing the phase of the ideal signal sample towards the phase of the copy signal corresponds to forming the reference signal sample by adding to the ideal signal sample a filtered version of the difference between the copy signal and ideal signal.

Figure 4:
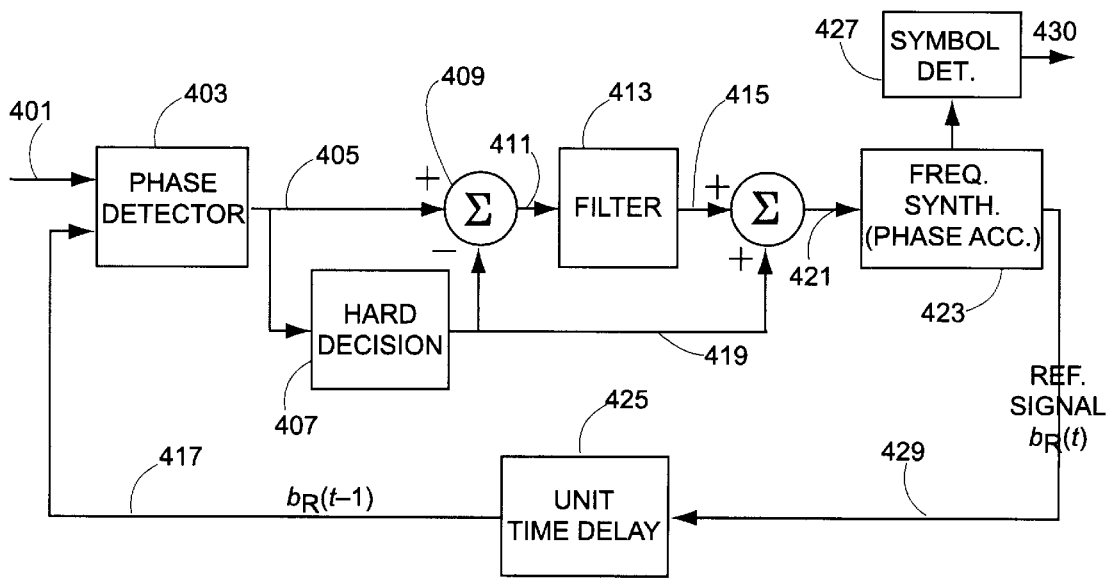
FIG. 4 shows a block diagram for a tracking reference signal generator and demodulator used in the preferred embodiment of the invention.

This is now described in detail with the aid of FIG. 4 using the π/4 DQPSK PHS signal as an example. Modifying for other modulation schemes would be clear to one in the art. Phase detector unit 403 detects the phase difference 405 between the copy signal 401 (corrected for the timing and frequency offsets) and the previous reference signal 417. The phase difference signal 405 is fed to a slicer 407 to generate the decision phase difference 419. The correct phase difference for π/4 DQPSK is $(2i-1)\pi/4$, i=1, 2, 3, or 4, and is the phase difference between the previous reference signal sample and the ideal signal. This is subtracted in block 409 from the actual phase difference 405 to generate error signal 411. This error signal is filtered in filter 413 to generate filtered error signal 415. It is this filtered error signal that is used to adjust the phase difference 419 closer to the actual phase difference 405. The corrected phase difference 421 is then used in a frequency synthesizer/phase accumulator 423 to generate the reference signal 429. It is the previous sample value 417 of the reference signal 429 that is used by phase detector 403, so a unit time delay 425 is shown between these signals. The symbols of the signal 430 (signal 319 after the $N_2$ iterations) are determined by block 427. Mathematically, if $b_R(t)$ denotes the reference signal complex sample values at the baud point t, and ∠ denotes the phase, the input to phase accumulator 423, $\angle b_R(t)-\angle b_R(t-1)$, is $$\text{filter}\{\angle d_{ideal}(n)-\text{decide}\{\angle d_{ideal}(n)\}\}+\text{decide}\{\angle d_{ideal}(n)\},$$

where decide$\{\angle d_{ideal}(n)\}$ is the output of slicer 407 and equals $(2i-1)\pi/4$, i=1, 2, 3 or 4 for π/4 DQPSK. In this, the "ideal" complex valued sample points $b_{ideal}(t)$ are defined as follows:

$$b_{ideal}(0)=b_R(0)=b(0),$$

where b(t) are the samples of input signal 401, and $\angle d_{ideal}(t)$ is the phase difference between the present input sample and the previous reference signal sample:

$$\angle d_{ideal}(t)=\angle b(t)-\angle b_R(t-1)=\angle[b(t)b_R^*(t-1)],$$

where * denotes the complex conjugate. The "ideal" signal is the reference signal with the phase advanced by an ideal amount, that amount depending on the decision made according to $\angle d_{ideal}(t)$. That is, $$\angle b_{ideal}(t)=\angle b_R(t-1)+(2i-1)\pi/4, i=1, 2, 3, \text{ or } 4.$$

To obtain the reference signal, the phase of $b_{ideal}(t)$ is now relaxed towards the phase of b(t) by filtering the quantity $[\angle b(t)-\angle b_{ideal}(t)]$, the phase error between b(t) and $b_{ideal}(t)$, and adding the filtered quantity to the phase of $b_{ideal}(t)$. An alternate embodiment filters the quantity $(b(t)-b_{ideal}(t))$ rather than the phase error. The filter preferably is a constant of proportionality. Higher order filters may be sued. Mathematically, in one embodiment, $$\angle b_R(t)=\angle b_{ideal}(t)+\text{filter}\{\angle b(t)-\angle b_{ideal}(t)\},$$

and in another embodiment, the architecture of FIG. 4 may be modified slightly to use $$b_R(t)=b_{ideal}(t)+\text{filter}\{b(t)-b_{ideal}(t)\}.$$

In the preferred embodiment, the method of the flowchart of FIG. 3, including the tracking reference signal generator, is implemented as a set of instructions for the timeslot processor 217 which is a signal processor (DSP) device.

Figure 5A:
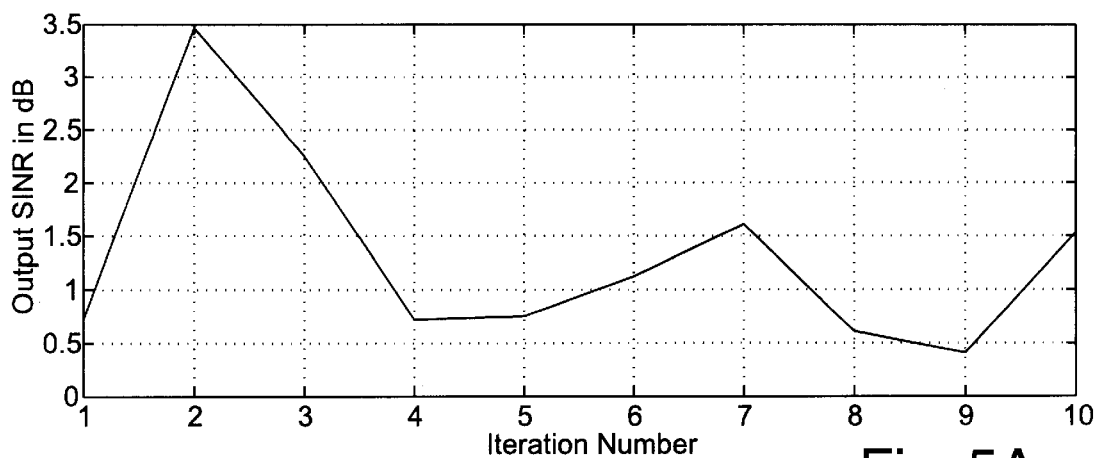
FIGS. 5A, 5B, and 5C show the performance of, respectively, a constant modulus method, a decision directed method, and an implementation of the hybrid method according to aspects of the invention.
Figure 5B:
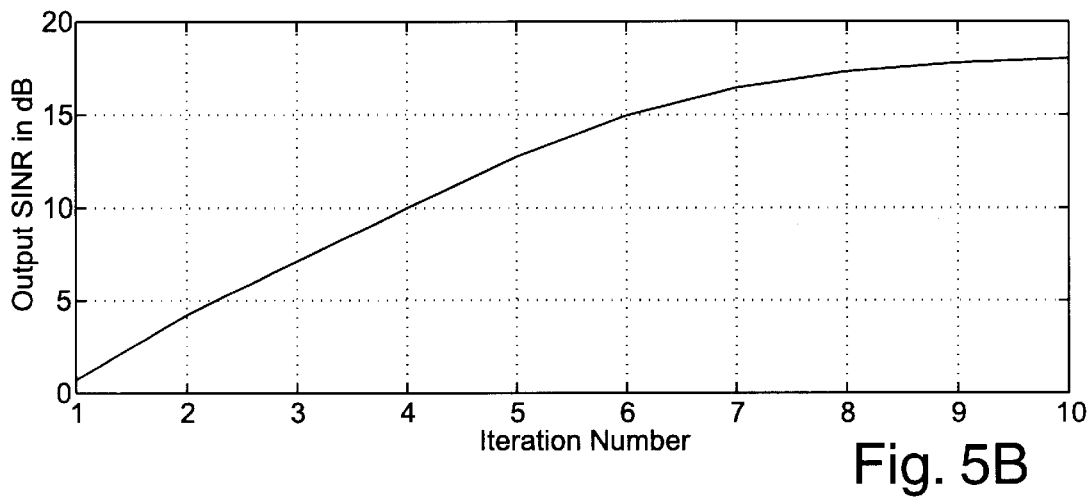
Figure 5C:
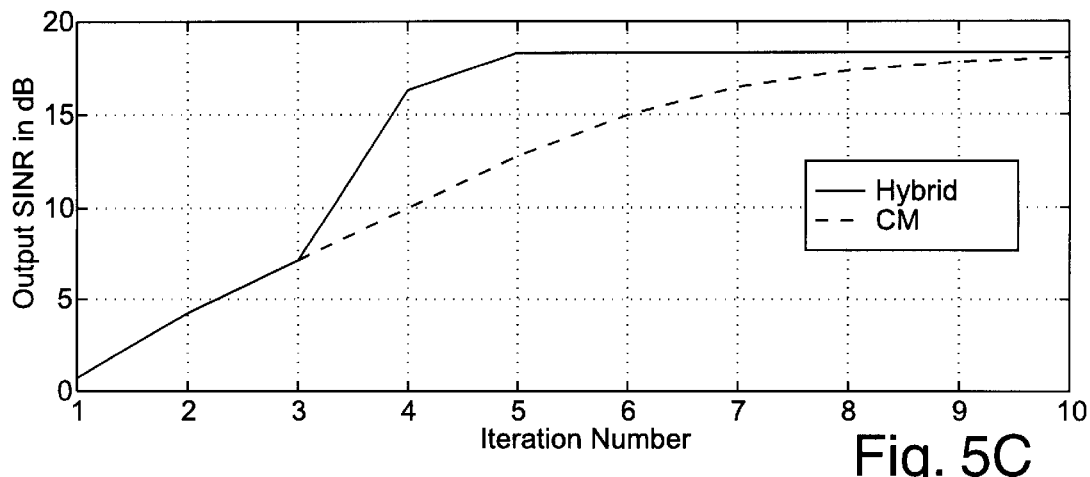

A simulation of the method of FIG. 3 was carried out for the system described, but with the initial weight vector the eigenvector of $R_{zz}=ZZ^H$ corresponding to the largest eigenvalue. The simulation was carried out for the PHS base station of FIG. 2 with four antenna elements. The input signals at each of the antennas had a signal-to-noise ratio (SNR) of 11.9 dB. The input carrier to interference ratio (CIR) was 1.1 dB, corresponding to an initial copy signal SINR of 0.8 dB. While a regular PHS burst has 120 symbols, only the center 75 symbols were used for the weight calculation. All calculations were carried out offline using the MATLAB environment (The Mathworks, Inc., Natick, Mass.). The results are shown in FIGS. 5A, 5B, and 5C, which compare the convergence characteristics of the decision directed method, the least squares CM method, and the combined method of the present invention under low SINR conditions (in this case, a post-copy SINR of about 0.8 dB after the first copy operation with the initial weight vector). The output SINR (dB) after each iteration is measured and plotted using the SINR estimation method. The first SINR value shown is when the SINR is estimated after the copy operation with the initial weight vector (first singular vector of $R_{zz}$). This is the same for all three methods. As seen on FIG. 5A, the decision directed method does not converge even after 10 iterations. FIG. 5B shows that the CM method converges slowly, with the output (estimated) SINR steadily increasing as the iteration proceeds. The optimal SINR is 18 dB, and the CM method takes more than 10 iterations to converge to this optimal value. FIG. 5C shows the method of the present invention operating with a switchover output SINR threshold of 7.5 dB. Notice that the results start off identical to that of FIG. 5B but then diverge after the switchover to the decision directed method (the results of FIG. 5B are shown dashed after the switchover). After the decision directed method starts, the method reaches the optimal SINR after only 2 iterations of the decision directed method, and gets very close to the optimal even after only one iteration of the decision directed method. Overall, the method of the flowchart of FIG. 3 converges within 5 iterations as opposed to more than 10 iterations if only the CM method is used.

Multi-port Architecture

When there are several, say $N_s$, subscriber units, both in-cell and out-of-cell, that are in the same conventional channel (i.e., co-channel users), the preferred embodiment of this invention uses a multi-port architecture, each "port" separately forming the copy signal and tracking a single one of the $N_s$ subscriber units, any port's subscriber unit thus being a co-channel interferer to the other $N_s$ subscriber units and their corresponding ports. Only co-channel users that have signal components received at the antenna elements that are above some noise floor are so tracked. The number of such users may be estimated. Given any burst (matrix Z), the eigenvalues of $R_{zz}=ZZ^H$ may be examined and an order estimation may be performed. Any order estimation method may be used. For example, the Rissanen minimum descriptive length (MDL) criterion, or the Akaike information theoretic criterion are well known. For a survey of techniques for determining the number of significant co-channel users, see Section 3.8 of Rias Muhamed and T. S. Rappaport: "Direction of arrival estimation using antenna arrays," Technical Report MPRG-TR-96-03, Mobile and Portable Radio Research Group, Bradley Department of Electrical engineering, Virginia Polytechnic Institute, January 1996 (also Rias Muhamed: "Direction of arrival estimation using antenna arrays," Masters Thesis, Bradley Department of Electrical Engineering, Virginia Polytechnic Institute and State University, Blacksburg, Va. 24061, USA). The preferred embodiment uses the minimum descriptive length criterion.

While the preferred embodiment includes estimating and then tracking all the "significant" co-channel users, in another embodiment, a "good" wireless design environment is assumed, that is, co-channels users not communicating with the same base station are assumed far away, so that the only co-channel users of significance are those users that share the same conventional channel and communicate with the base station. That is, the subscriber units that are the different spatial channels in the conventional channel. In such a case, $N_s$ is known.

Considering, for example, when there are two known (by estimation or by knowledge) co-channel users (i.e., $N_s=2$) in the environment. When tracking one of the subscriber units, the other subscriber unit is an interferer. Therefore in this architecture, the desired signal and the significant interferers communicating in the same conventional communication channel are simultaneously tracked. In a fading environment as encountered, for example when the subscriber units move rapidly, the carrier-to-interference-ratio (CIR) may be very low and the instantaneous CIRs can fluctuate over a wide range. At any point in time, at any given burst, the desired signal therefore may be weaker than any of its interferers and the desired signal's port may become interferer-locked. That is, it may start tracking an interferer rather than a desired remote user.

Figure 6:
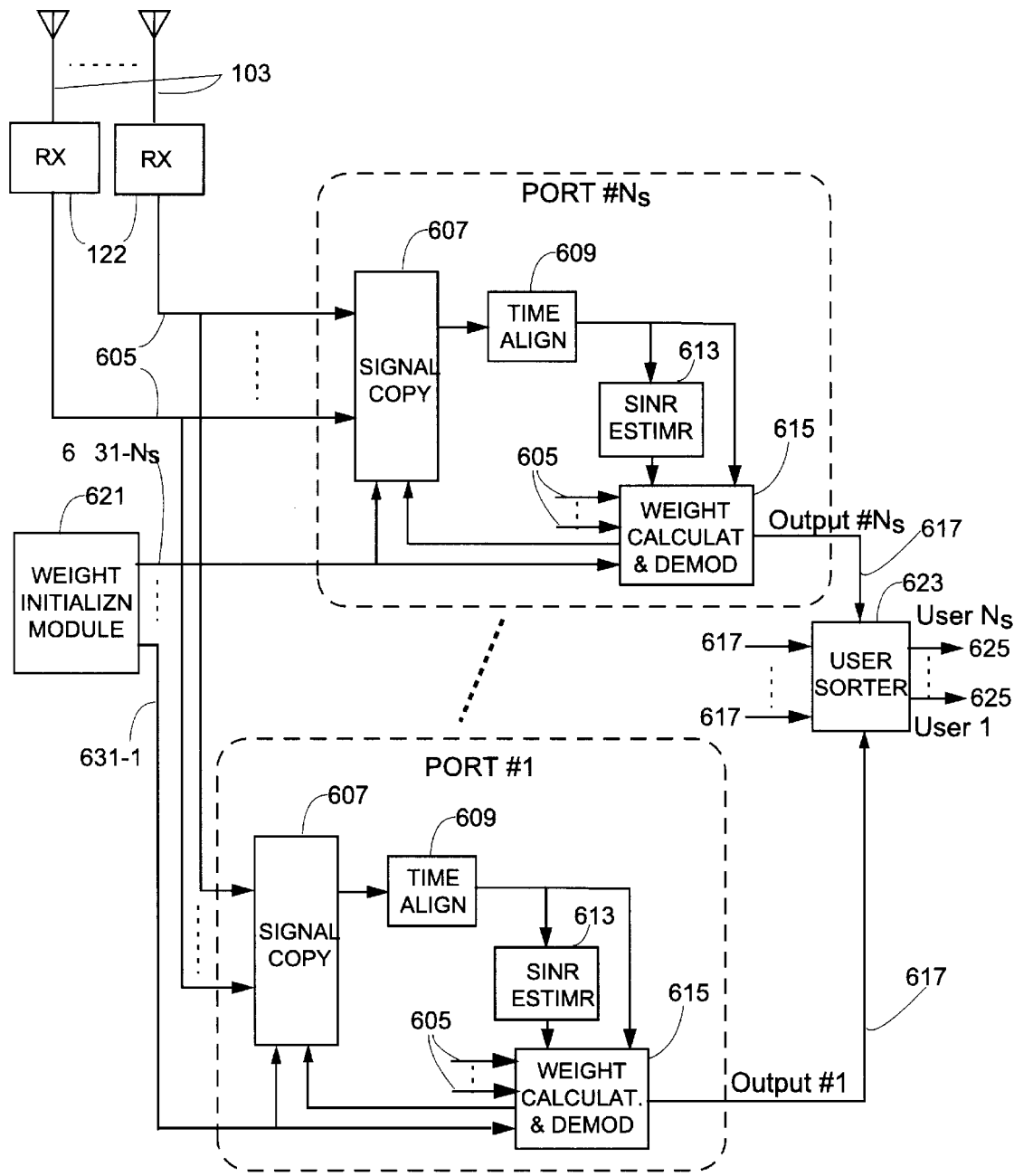
FIG. 6 shows a block diagram of the multiport weight determiner and spatial processor according to the preferred embodiment of the invention.

FIG. 6 shows the block diagram of the preferred embodiment multi-port adaptive smart antenna processing apparatus. In each port, the oversampled outputs 605 of receivers 122 from the antenna elements 103 are combined in a signal copy operation 607, initially using an initial weight vector 631-i, i=1, ..., $N_s$ for the first, ..., $N_s$th port, respectively, these initial weights provided by a weight initializer 621. The resulting copy signal is timing offset corrected by timing offset corrector unit 609 which also decimates/interpolates to produce a set of approximately baud-aligned samples (for the CM method iterations) or substantially baud-aligned samples (for the decision directed method iteration(s)) baud-aligned samples. The baud-aligned samples are fed into an SINR estimator 613 the output of which is fed into a weight calculator and demodulator 615 which uses the baud-point aligned samples and/or the antenna signals 605 to determine a reference signal and a set of weights according to the inventive method described herein. Since at least one iteration of a decision directed method is used in weight calculator and demodulator 615, the output is a demodulated signal 617. In this way, $N_s$ demodulated signals for $N_s$ subscriber units are determined. Having multiple ports enables tracking both any desired subscriber unit-sent signal, and any co-channel interferer. The adaptation method further described below has the ability to switch between any desired user and the interferer in a fading environment. So by using $N_s$ ports, the $N_s$ users are tracked at the same time, and if any user's signals jumps from one port to the other, which might occur in a fading environment, the output of the ports is sorted in user sorter 623 to separate the desired user from any interferers, and correctly output $N_s$ demodulated signals 625.

Other multiport architectures are known but not for use with the adaptive methods described herein. See, for example, B. G. Agee: "Blind separation and capture of communication signals using a multitarget constant modulus beamformer," 1989 *IEEE Military Communications Conference* ("*MILCOM* 89"), vol. 2, pp. 340–346, New York: IEEE, 1989, for a multiport architecture for a constant modulus method. The Agee method differs in several respects from the method described herein, including for example, 1) in the weight initialization method; 2) in what computations are carried out in each of the ports. Agee's method jointly orthogonalizes all the weight vectors at each stage of the iteration, which is computationally expensive, while the preferred embodiment of the present invention, after jointly initializing each of the ports, allows each port to adapt independently; 3) the method of determining weight vectors is different. Note that since it is anticipated that in the future, computational power will become more readily available, in an alternate embodiment, each port's weight vector is made orthogonal.

The Preferred Weight Determining Method: Multiple User

Figure 7:
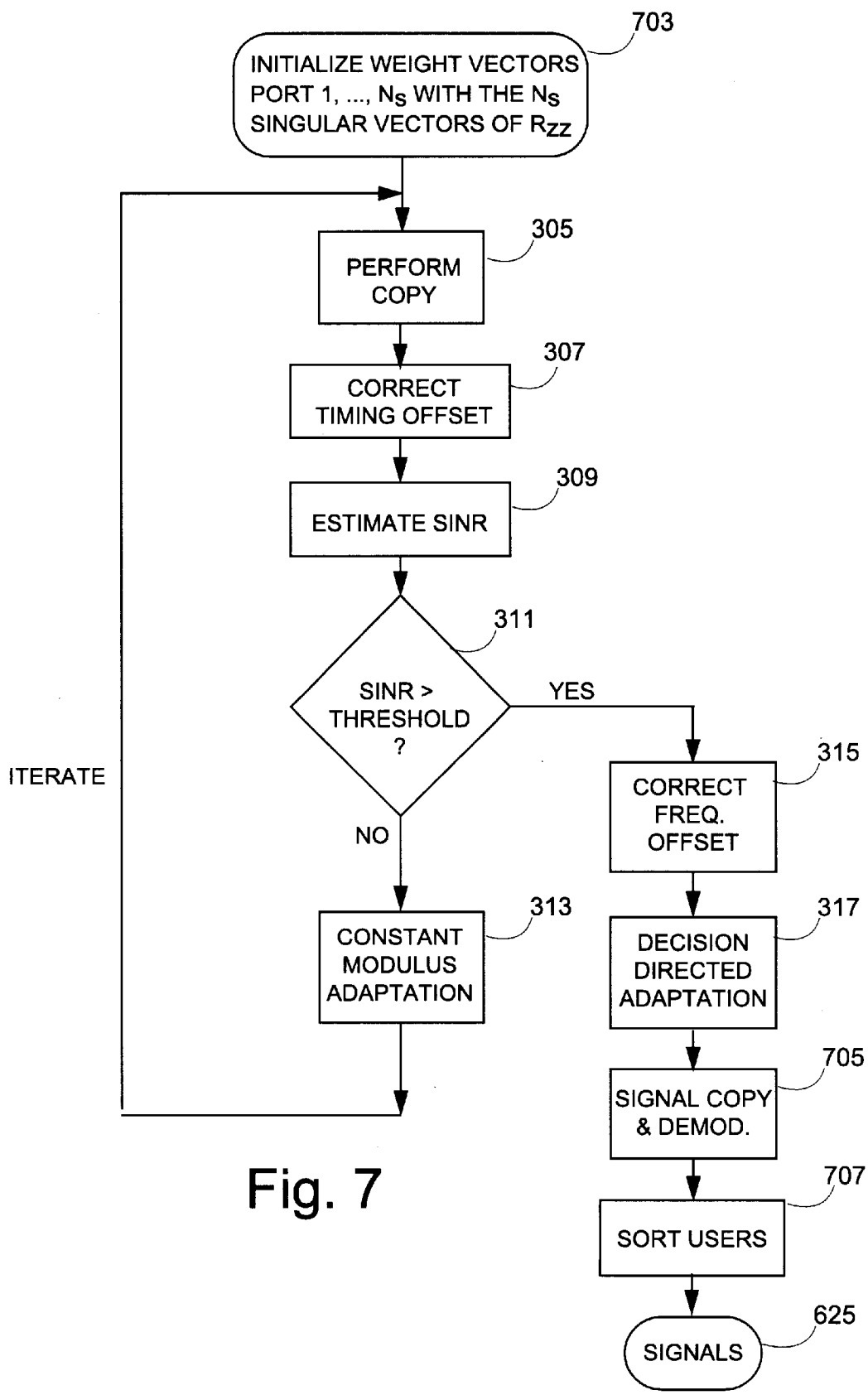
FIG. 7 is a flow chart of the preferred embodiment of the multiuser weight determining method of the present invention.

FIG. 7 describes by means of a flow chart preferred method for determining the weights and the output signals 625. To start with, the initial copy is performed using the eigenvectors of the $R_{zz}$ matrix. The port labeled "#1" is initialized in step 703 with the eigenvector 631-1 corresponding to the largest singular value, the second port with the next eigenvector 631-2, . . . , and the $N_s$th port with the $N_s$th eigenvector 631-$N_s$. These eigenvectors are guaranteed to be linearly independent, and also, are in general a preferred value to start with. Alternatively, any substantially independent initial weight vectors may alternatively be used. For example, in an alternate embodiment, port #1 is initialized with the vector [1 0 0 . . . 0]', port #2 with the vector [0 1 0 0 . . . 0]', and so forth. In each port, after initialization, the method proceeds in the manner in each port as for the single user case of the flow chart of FIG. 3. That is, step 305 is the copy operation performed first with the initial value. The resulting signal is in step 307 timing offset corrected (which includes decimation/interpolation if initially oversampled) to produce substantially baud aligned samples which are fed into a signal quality estimator which in step 309 estimates the SINR substantially on the baud points. A decision is made in step 311 whether to choose the CM method or the decision directed method for the weight adaptation. If the SINR is below a predefined SINR threshold, an optimization based on a partial property restoral method (preferably the CM method) is carried out in step 313 and the method returns to step 305 for another iteration, starting with the most recently determined weight vector for this port. If the SINR is above the threshold, then in step 315 frequency offset correction is carried out, and a single decision directed adaptation iteration is carried out in step 317. Note that if the timing offset correction was only approximate in step 307, a more accurate correction would be needed for the decision directed method, and such a modification would be clear to one of ordinary skill in the art. Only one decision directed iteration is carried out in the preferred embodiment. Alternatively, more than one decision directed iteration is carried out. When the weight is determined, since in the preferred embodiment, only a subset of the samples in each burst is used, the finally determined weight vectors for each port are used in a copy operation and demodulation step on the whole burst. This copy operation in the preferred embodiment includes timing and frequency offsets determination and correction, and demodulation, the demodulation preferably using the architecture shown in FIG. 4. The result for each port is a demodulated signal 617.

Note that one feature of the invention in both the single-user and multi-user case is using the weight obtained using the current burst's data for determining the signal for the current burst. When the subscriber units move around, and in other fading and low SINR environments, using a weight vector from the previous burst may not produce good results.

The final step is the sorting of these outputs to determine if any of the output ports have become interferer-locked. PHS bursts, for example traffic channel bursts, include fields for the payload, a unique word (UW) that is known to all subscriber units, and a error detecting cyclic redundancy check (CRC) field. Other protocols include somewhat different fields that may be used to determine if a particular message is from a particular subscriber unit or for a particular base station. To determine interference locking, in the preferred embodiment, the idea is to distinguish a desired subscriber unit sending a waveform valid for the system from an interfering subscriber unit also sending a waveform which is valid for the system. That is, means exist for defining a "valid" subscriber unit waveform, for example, the waveform having some required data and modulation format and scrambled with a particular key for the subscriber unit. An interfering unit similarly would include some means for defining its own validity, for example the waveform having some required data and modulation format and scrambled with a particular key different from that for the subscriber unit. In the preferred PHS implementation, one method for detecting interferer-locking includes monitoring both the unique word (UW) and the CRC. It is specified that the data bits in each burst be scrambled with a bit pattern that is generated using the lower 9 bits of the cell station identification code (CSID). This 9-bit word used to cipher both the burst payload and its associated CRC is called the scrambling key. When designing a communications system, for example a cellular system, it is advisable to make sure that neighboring communications stations (base stations) each have a different scrambling key. Note that in the PHS specification, a base station or communications station is called a cell station.

Knowing that, the preferred embodiment basic interferer-locking detection method involves the following steps:

For a particular port, that is, a particular subscriber unit, 1. demodulating the signal received using a receive weight determined for the subscriber unit, and descrambling the burst payload using the CSID-based key for the subscriber unit;
2. comparing the received CRC with the CRC computed from the demodulated descrambled bit sequence of the burst pay load;
3. determining if both significantly differ, which indicates a transmission error or that the key is wrong, while the UW shows no errors, and if the condition is met, triggering a counter. If weight "tracking" is included, if the condition is not met, the communication is assumed not to be interferer-locked and the weight used for receiving from the subscriber unit (or the subscriber unit spatial signature) is saved ("tracked") as a "good" value for the subscriber unit; and
4. if a certain number of consecutive bursts meet the condition stated in step 3, as determined by the counter, determining the port is determined to be interferer-locked.

In the present PHS specification, using the unique word and CRC to determine interference locking would not work when the co-channel users are all different spatial channels in the same conventional channel because the CSID is the same for all subscriber units of the same conventional channel. Determining interferer-locking for the case of the co-channel users being the spatial channels of the same conventional channel can be done by maintaining spatial signature histories for the co-channel users.

Once the outputs are sorted, the result is a set of output signals from each of the ports.

The Apparatus

Figure 9:
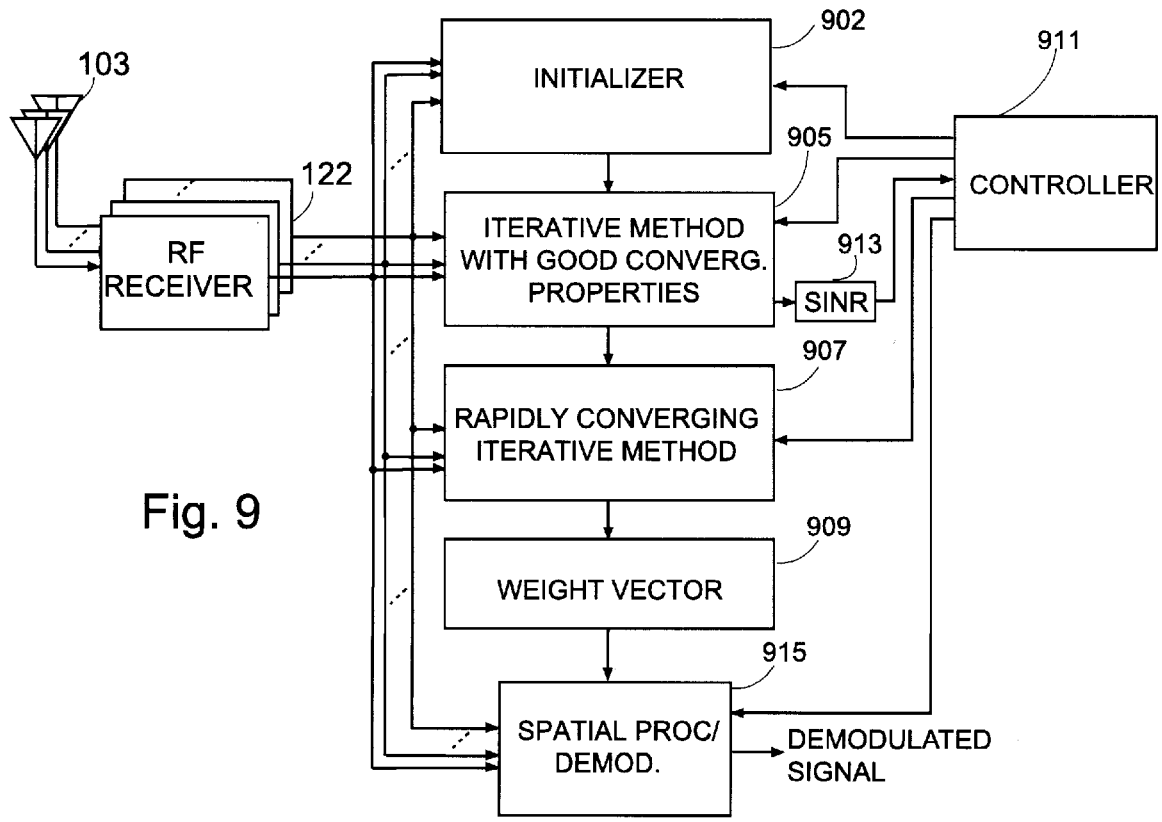
FIG. 9 shows a block diagram of an apparatus implementing an aspect of the invention.

FIG. 9 shows a block diagram of an apparatus implementing an aspect of the invention. The apparatus for determining the weight vector for receiving a particular signal transmitted by a particular subscriber unit includes initializing means 902 for initializing with a first initial vector value, first iterative means 905 for iteratively modifying the weight vector according to a first iterative method which minimizes a first cost function, the first iterative method being an iterative weight determining method with good convergence properties, preferable the constant modulus method implemented as described hereinabove. The apparatus also includes second iterative means 907 for iteratively modifying the weight vector according to a second adaptive method which minimizes a second cost function, the second adaptive method being a rapidly converging iterative weight determining method, preferably the decision directed method described hereinabove. Initializer 902, first iterative means 905, and second iterative means 907 are under control of control means 911 programmed to activate first iterative means 905 starting from the first initial vector value provided by initializing means 902 until a switching criterion is met, the final weight vector after the final iteration of the first adaptive method being a second vector value, and to activate the second iterative means 907 starting from the second vector value to determine the weight vector 909. The weight vector 909 is used by a spatial processor and demodulator 915 to produce, when directed by controller 911, the demodulated signal, the spatial processor using signals received via receivers 122 at the antenna array 103. Each of the iterative methods includes determining a copy signal. The apparatus preferably includes a SINR estimator 913 to estimate the post copy SINR in the first iterative means copy signal using the weight vector determined by the first iterative means 905, and the switching criterion preferably is the SINR estimate exceeding a SINR threshold.

The weight determining apparatus preferably includes at least one digital signal processor (DSP) devices at the base station, and the elements 902, 905, 907, 909, 911, 913, and 915 preferably are implemented as programs in the one or more DSP.

As will be understood by those skilled in the art, the skilled practitioner may make many changes in the methods and apparatuses as described above without departing from the spirit and scope of the invention. For example, the communication station in which the method is implemented may use one of many protocols. In addition, several architectures of these stations are possible. Many more variations are possible. The true spirit and scope of the invention should be limited only as set forth in the claims that follow.

What is claimed is:

1. A method for performance improvement of a communication receiver receiving signals transmitted from one or more subscriber units, the communication receiver having an array of antenna elements, the method comprising smart antenna processing signals received by each of the antenna elements of the antenna array to provide a smart antenna processed signal, the adaptive smart antenna processing according to a weight vector determined from the signals received by each of the antenna elements, the weight vector determining comprising:

initializing with a first vector value;
   until a switching criterion is met and starting from the first vector value, iteratively modifying the weight vector according to a first adaptive method which minimizes a first cost function, the first adaptive method being an iterative weight determining method with good convergence properties, the final weight vector after the final iteration of the first adaptive method being a second vector value;
   starting from the second vector value, modifying the weight vector according to a second adaptive method which minimizes a second cost function, the second adaptive method being a rapidly converging iterative weight determining method,
each iteration of both the first and the second adaptive methods comprising determining a copy signal formed from sets of samples from each of the received signals, one set of samples from each received signal, the copy signal formed using the then current weight vector value.

2. The method of claim 1, wherein the signals are received at each antenna element burst-by-burst, and wherein the sets of samples are from mutually contemporary bursts, and wherein the adaptive smart antenna processing of any set of mutually contemporary bursts uses the weight vector determined from sets of samples of the same mutually contemporary bursts.

3. The method of claim 1, wherein the weight vector determining is blind.

4. The method of claim 1, wherein the weight vector determining uses at least one digital signal processor.

5. The method of claim 3, wherein the received signals comprise TDMA signals.

6. The method of claim 5, wherein the received signals substantially conform to PHS signals.

7. In a communication receiver receiving signals transmitted from one or more subscriber units, the communication receiver having an array of antenna elements and adaptive smart antenna processing means, the adaptive smart antenna processing means including means for weighting the signals received by each of the elements of the antenna array in amplitude and phase according to a weight vector for each subscriber unit, the weighting forming a copy signal for the subscriber unit, a method of determining the weight vector for receiving a particular signal transmitted by a particular subscriber unit, the method comprising:

initializing with a first initial vector value;
   until a switching criterion is met and starting from the first initial vector value, iteratively modifying the weight vector according to a first adaptive method which minimizes a first cost function, the first adaptive method being an iterative weight determining method with good convergence properties, the final weight vector after the final iteration of the first adaptive method being a second vector value; and
   starting from the second vector value, modifying the weight vector according to a second adaptive method which minimizes a second cost function, the second adaptive method being a rapidly converging iterative weight determining method.

8. The method of claim 7, wherein the switching criterion is a specified first number $N_1$ of iterations.

9. The method of claim 7, wherein the first adaptive method includes a copy generation step, and wherein switching criterion is the estimated SINR at the output of the copy generation.

10. The method of claim 7, wherein the first adaptive method is a partial property restoral method and the second adaptive method is a decision directed method.

11. The method of claim 10, wherein the first adaptive method is a constant modulus method.

12. The method of claim 10, wherein each iterative method includes a copy generation step, and wherein the second cost function includes a difference term, the difference being between a weighted signal and a decision directed reference signal formed from the copy signal, the decision directed reference signal forming including a tracking mechanism that forms the phase of the reference signal at a sample point by relaxing the phase of a signal ideally advanced from a previous reference signal sample, towards the phase of the copy signal at the same sample point.

13. The method of claim 10, wherein each iterative method includes a copy generation step, and wherein the first cost function includes a square of difference term, the difference being between a weighted signal and a constant modulus reference signal formed from the copy signal.

14. In a communication receiver receiving signals transmitted from a plurality of subscriber units, the communication receiver having an array of antenna elements and adaptive smart antenna processing means, the adaptive smart antenna processing means including weighting means for weighting the signals received by each of the elements of the antenna array in amplitude and phase according to a weight vector for a particular remote subscriber unit, the weighting forming a copy signal for that subscriber unit, a method of determining the weight vectors for receiving signals transmitted by the plurality of subscriber units, the method comprising:

for each subscriber unit, initializing with a first initial vector value, the set of first initial vector values being sufficiently mutually independent; and for each weight vector for each subscriber unit, until a switching criterion is met and starting from the first initial vector value, iteratively modifying the weight vector according to a first adaptive method which minimizes a first cost function, the first adaptive method being an iterative weight determining method with good convergence properties, the final weight vector after the final iteration of the first adaptive method being a second vector value; and starting from the second vector value, modifying the weight vector according to a second adaptive method which minimizes a second cost function, the second adaptive method being a rapidly converging weight determining method.

15. The method of claim 14, wherein the switching criterion is a specified first number $N_1$ of iterations.

16. The method of claim 14, wherein the first adaptive method includes a copy generation step, and wherein the switching criterion is the estimated SINR at the output of the copy generation step.

17. The method of claim 14, wherein the first adaptive method is a partial property restoral method and the second adaptive method is a decision directed method.

18. The method of claim 17, wherein the first adaptive method is a constant modulus method.

19. The method of claim 14, wherein the set of first initial values are linearly independent.

20. The method of claim 19, wherein the set of first initial values are the largest eigenvectors of $R_{zz}$, wherein there are m antenna elements and $R_{zz}$ is the autocorrelation matrix of the m-vector of signals formed at m antenna elements.

21. In a communication receiver receiving signals transmitted from one or more subscriber units, the communication receiver having an array of antenna elements and spatio-temporal processing means, the spatio-temporal processing means including means for jointly weighting and time-equalizing the amplitude and phase of the signals received by each of the elements of the antenna array according to a complex valued weight matrix for each subscriber unit, the convolving forming a copy signal for the subscriber unit, a method of determining the weight matrix for receiving a particular signal transmitted by a particular subscriber unit, the method comprising:

initializing with a first initial matrix value;

until a switching criterion is met and starting from the first initial matrix value, iteratively modifying the weight matrix according to a first adaptive method which minimizes a first cost function, the first adaptive being an iterative weight determining method with good convergence properties, the final weight matrix after the final iteration of the first adaptive method being a second matrix value; and starting from the second matrix value, iteratively modifying the weight matrix according to a second adaptive method which minimizes a second cost function, the second adaptive method being a rapidly converging weight determining method.

22. In a communication receiver receiving signals transmitted from one or more subscriber units, the communication receiver comprising an array of antenna elements and adaptive smart antenna processing means, the adaptive smart antenna processing means including means for weighting the signals received by each of the elements of the antenna array in amplitude and phase according to a weight vector for each subscriber unit, the weighting forming a copy signal for the subscriber unit, an apparatus for determining the weight vector for receiving a particular signal transmitted by a particular subscriber unit, the weight determining means comprising:

initializing means for initializing with a first initial vector value;

first iterative means for iteratively modifying the weight vector according to a first adaptive method which minimizes a first cost function, the first adaptive method being an iterative weight determining method with good convergence properties, second iterative means for iteratively modifying the weight vector according to a second adaptive method which minimizes a second cost function, the second adaptive method being a rapidly converging iterative weight determining method, and a controller for activating the first iterative means starting from the first initial vector value provided by the initializing means until a switching criterion is met, the final weight vector after the final iteration of the first adaptive method being a second vector value, and activating the second iterative means starting from the second vector value to determine the weight vector.

23. The apparatus of claim 22, wherein the switching criterion is a specified first number $N_1$ of iterations.

24. The apparatus of claim 22, further comprising an SINR estimator, wherein the first adaptive method includes a copy generation step, wherein the SINR estimator estimates the SINR at the output of the copy generation step in the first adaptive method, wherein the SINR estimator output is coupled to the controller, and wherein switching criterion is the estimated SINR at the output of the first adaptive method copy generation step.

25. The apparatus of claim 22, wherein the first adaptive method is a partial property restoral method and the second adaptive method is a decision directed method.

26. The apparatus of claim 25, wherein the first adaptive method is a constant modulus method.

27. The apparatus of claim 25, wherein each iterative method includes a copy generation step, and wherein the second cost function includes a difference term, the difference being between a weighted signal and a decision directed reference signal formed from the copy signal, the decision directed reference signal forming including a tracking mechanism that forms the phase of the reference signal at a sample point by relaxing the phase of a signal ideally advanced from a previous reference signal sample, towards the phase of the copy signal at the same sample point.

28. The apparatus of claim 25, wherein each iterative method includes a copy generation step, and wherein the first cost function includes a square of difference term, the difference being between a weighted signal and a constant modulus reference signal formed from the copy signal.

29. The apparatus of claim 22, wherein the signals received at each antenna element comprise a sequence of bursts, and wherein the adaptive smart antenna processing of any set of mutually contemporary bursts uses the weight vector determined from sets of samples of the same mutually contemporary bursts.

30. The apparatus of claim 22, wherein the weight vector determining is blind.

31. The apparatus of claim 22, further comprising at least one digital signal processor.

32. The apparatus of claim 29, wherein the received signals comprise TDMA signals.

33. The apparatus of claim 32, wherein the received signals substantially conform to PHS signals.

* * * * *